United States Patent
Yashiro et al.

(10) Patent No.: US 9,870,493 B2
(45) Date of Patent: Jan. 16, 2018

(54) ANTENNA LOOP CONFIGURATION FOR MORE EFFICIENTLY SURROUNDING THE HIGH INTENSITY AREA OF THE MAGNETIC FIELD PRODUCED BY AN IC CARD

(71) Applicant: Sharp Kabushiki Kaisha, Sakai, Osaka (JP)

(72) Inventors: Yuhji Yashiro, Sakai (JP); Hiroyuki Ogawa, Sakai (JP); Yasuhiro Sugita, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/529,081

(22) PCT Filed: Nov. 18, 2015

(86) PCT No.: PCT/JP2015/082352
§ 371 (c)(1),
(2) Date: May 23, 2017

(87) PCT Pub. No.: WO2016/084667
PCT Pub. Date: Jun. 2, 2016

(65) Prior Publication Data
US 2017/0344766 A1 Nov. 30, 2017

(30) Foreign Application Priority Data
Nov. 25, 2014 (JP) .................................. 2014-237688

(51) Int. Cl.
*G06K 7/10* (2006.01)
*H01Q 7/00* (2006.01)
(Continued)

(52) U.S. Cl.
CPC ........... *G06K 7/10247* (2013.01); *H01Q 1/44* (2013.01); *H01Q 7/00* (2013.01); *H01Q 7/005* (2013.01); *G06Q 20/105* (2013.01)

(58) Field of Classification Search
CPC ............ H01Q 1/44; H01Q 7/005; H01Q 7/00; G06K 7/10247; H04B 5/0037; H04B 5/0081
See application file for complete search history.

(56) References Cited

U.S. PATENT DOCUMENTS

| | | | | |
|---|---|---|---|---|
| 5,966,641 A | * | 10/1999 | Flowerdew | H01Q 7/00 343/867 |
| 2005/0134519 A1 | * | 6/2005 | Fukano | G06K 7/10336 343/867 |

(Continued)

FOREIGN PATENT DOCUMENTS

JP 4814223 B 11/2011

*Primary Examiner* — Devan Sandiford
(74) *Attorney, Agent, or Firm* — ScienBiziP, P.C.

(57) ABSTRACT

A communication device including a device-side antenna 30 for wireless communication with an IC card 10 including a card-side antenna 11 wound in a rectangular form. The antenna 30 is formed in one or multiple loops. During the wireless communication with the IC card 10 having an inner perimeter with a long dimension of 69 mm and a short dimension of 38 mm at a distance of 25 mm, an inner perimeter of the antenna 30 is formed at a position at which intensity H of a magnetic field produced by the card-side antenna 11 in a direction perpendicular to a surface on which the antenna 30 is disposed is in a range expressed by inequation (1):

$$0.037I/4\Pi < H < 0.063I/4\Pi \quad (1)$$

where I is a current of the card-side antenna [A] and Π is pi.

6 Claims, 12 Drawing Sheets

(51) Int. Cl.
*H01Q 1/44* (2006.01)
*G06Q 20/10* (2012.01)

(56) References Cited

U.S. PATENT DOCUMENTS

| | | | | |
|---|---|---|---|---|
| 2007/0188375 A1* | 8/2007 | Richards | ............... | G01S 11/06 342/125 |
| 2008/0117027 A1* | 5/2008 | Tsirline | ............... | H01Q 1/2208 340/10.6 |
| 2008/0300658 A1* | 12/2008 | Meskens | ............... | A61N 1/08 607/60 |
| 2009/0051620 A1 | 2/2009 | Ishibashi et al. | | |
| 2009/0140938 A1 | 6/2009 | Ishibashi et al. | | |
| 2010/0248623 A1* | 9/2010 | Haratani | ............... | H04B 5/0031 455/41.1 |
| 2010/0282849 A1* | 11/2010 | Mair | ............... | G06K 7/0008 235/439 |
| 2012/0322372 A1* | 12/2012 | Hansen | ............... | H04B 5/0031 455/41.1 |
| 2013/0241302 A1* | 9/2013 | Miyamoto | ............... | H02J 50/12 307/104 |
| 2013/0321230 A1* | 12/2013 | Merlin | ............... | H01Q 1/2225 343/787 |
| 2014/0104133 A1* | 4/2014 | Finn | ............... | G06K 19/07769 343/866 |
| 2016/0020517 A1* | 1/2016 | Florek | ............... | H01Q 7/08 455/150.1 |
| 2017/0126070 A1* | 5/2017 | Lee | ............... | H02J 50/80 |

\* cited by examiner

FIG.6
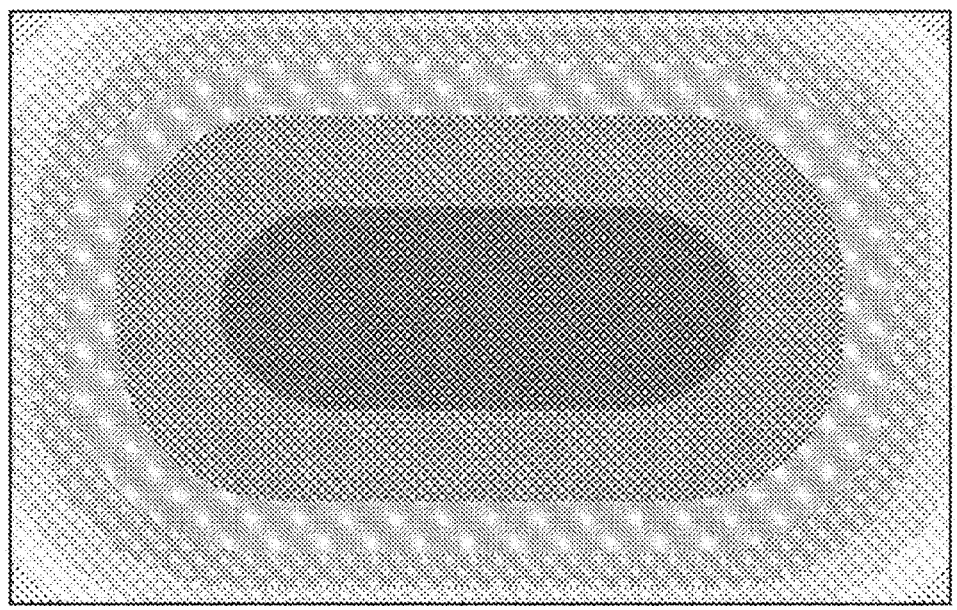
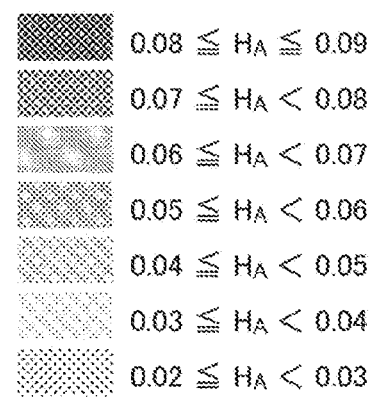

FIG.7

| HA | Q FACTOR |
|---|---|
| 0.037 | 19.23913 |
| 0.04 | 19.42234 |
| 0.042 | 19.59228 |
| 0.044 | 19.74692 |
| 0.046 | 19.93455 |
| 0.048 | 20.03337 |
| 0.05 | 20.12877 |
| 0.052 | 20.22928 |
| 0.054 | 20.22345 |
| 0.056 | 20.12812 |
| 0.058 | 20.06125 |
| 0.06 | 19.86513 |
| 0.061 | 19.61608 |
| 0.062 | 19.38375 |
| 0.063 | 19.24629 |
| 0.064 | 19.12416 |

ANTENNA LOOP CONFIGURATION FOR MORE EFFICIENTLY SURROUNDING THE HIGH INTENSITY AREA OF THE MAGNETIC FIELD PRODUCED BY AN IC CARD

TECHNICAL FIELD

The present invention relates to a communication device, a display device, and a communication system.

BACKGROUND ART

In recent years, a near field communication (NFC) technology is used for IC cards including electronic money. The NFC technology uses near field communication between an antenna of an IC card and an antenna of a reader/writer that is compatible with the communication standards of the IC card.

A regular antenna for receiving radio waves includes a metal trace. However, a transparent antenna that passes light is also known. For example, a transparent antenna disclosed in Patent Document 1 includes a sheet-like transparent substrate with an electrical isolation and an antenna pattern planarly formed on a surface of the transparent substrate. An electrically conductive portion of the antenna pattern is constructed from an electrically conductive thin film of a mesh structure and an outlines of each mesh are constructed from extra fine bands having substantially the equal width. The transparent antenna is attached to a display screen of a mobile phone to cover an entire display area. With the transparent antenna, the antenna is arranged without blocking the display screen.

RELATED ART DOCUMENT

Patent Document

Patent Document 1: Japanese Patent Publication No. 4814223

Problem to be Solved by the Invention

The transparent antenna has a specific resistance higher than a resistance of a thick metal wire that is normally used for forming a coil. A Q factor describing performance of the antenna ($Q=2\Pi fL/R$) is proportional to inductance L and inversely proportional to resistance R. As the resistance increases, the Q factor decreases. Therefore, the communication performance may decrease.

DISCLOSURE OF THE PRESENT INVENTION

The present invention was made in view of the above circumstances. An object is to restrict a decrease in communication performance.

Means for Solving the Problem

A communication device according to the present invention includes a device-side antenna for wireless communication with an IC card including a card-side antenna wound in a rectangular form. The device-side antenna is formed in one or multiple loops. During the wireless communication with the IC card having an inner perimeter with a long dimension of 69 mm and a short dimension of 38 mm at a distance of 25 mm, an inner perimeter of the device-side antenna is formed at a position at which intensity H of a magnetic field produced by the card-side antenna in a direction perpendicular to a surface on which the device-side antenna is disposed is in a range expressed by inequation (1):

$$0.037I/4\Pi < H < 0.063I/4\Pi \tag{1}$$

where I is a current of the card-side antenna [A] and $\Pi$ is pi.

According to the configuration, the area in which intensity of the magnetic field is high is efficiently surrounded by the device-side antenna with the smaller inner perimeter. Therefore, the device-side antenna has an efficient antenna shape with the lower resistance and the higher inductance. According to the configuration, the high Q factor that describes the performance of the antenna is achieved and thus the reduction in communication performance can be restricted.

Preferable embodiments of the present invention may include the following configurations.

The inner perimeter of the device-side antenna may be formed at a position at which the intensity H of the magnetic field is in a range expressed by inequation (2):

$$0.046I/4\Pi < H < 0.06I/4\Pi \tag{2}$$

The inner perimeter of the device-side antenna may be formed at positions where the intensity H of the magnetic field at one of the positions is equal to the intensity H at another one of the positions.

According to the configuration, an area in which the intensity of the magnetic field is partially low is not included in the area within the inner perimeter of the device-side antenna. Therefore, the area in which the intensity of the magnetic field is high is more efficiently surrounded by the device-side antenna with the length of the device-side antenna maintained low. According to the configuration, the higher Q factor that describes the performance of the antenna can be achieved and thus the decrease in communication performance is further restricted.

A display device includes the communication device, a lighting device, and a display device. The lighting device emits light. The display device includes a display portion for displaying an image with the light emitted by the lighting device and transmitted through the device-side antenna.

The display device may further include a bezel that holds an edge portion of the display device from a front side. A portion of the device-side antenna may be formed in an area covered with the bezel from the front side.

Because the light needs to be transmitted in the area in which an image is displayed, the device-side antenna cannot be formed with flexibility. In this configuration, the device-side antenna is formed in the area that is covered with the bezel from the front side. Therefore, the device-side antenna can be formed with a certain level of flexibility.

A communication system includes the IC card and the communication device.

Advantageous Effect of the Invention

According to the present invention, a decrease in communication performance can be restricted.

BRIEF DESCRIPTION OF THE DRAWINGS

FIG. 6 is a diagram illustrating intensity distribution of magnetic field produced by a card-side antenna on a surface on which a device-side antenna is disposed.

FIG. 7 is a table describing a relationship between HA and Q factor.

MODE FOR CARRYING OUT THE INVENTION

First Embodiment

A first embodiment will be described with reference to FIGS. 1 to 9. In this section, the X-axis direction, the Y-axis direction, and the Z-axis direction in FIG. 2 point to the left, the upside, and the rear, respectively.

A communication system includes an IC card 10 and a liquid crystal display device 20 (an example of "a display device") which can establish near field communication with the IC card 10.

Figure 1:
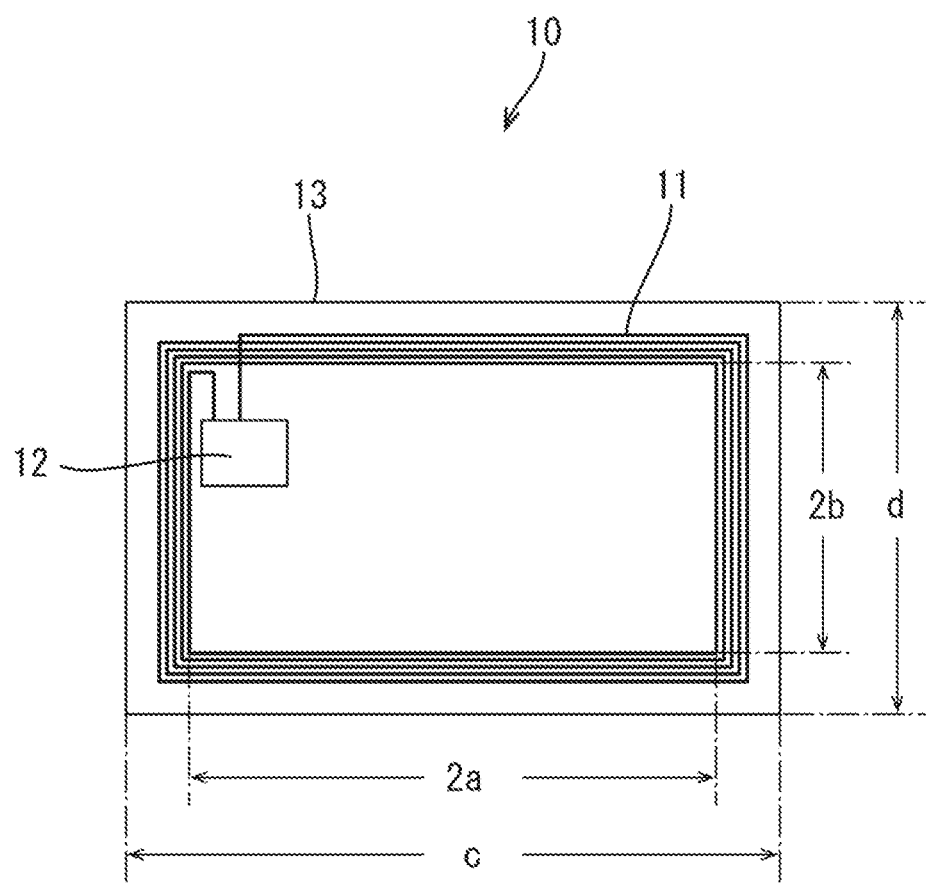
FIG. 1 is a front view illustrating an IC card according to a first embodiment.

As illustrated in FIG. 1, the IC card 10 includes a card-side antenna 11, an integrated circuit (IC) 12, and a substrate 13. The card-side antenna 11 includes a wound copper trace. The IC 12 is connected to an end of the card-side antenna 11. The substrate 13 has a plate shape. The card-side antenna 11 and the IC 12 are fixed to the substrate 13. The IC card 10 includes a memory, a resonance circuit, and a modulation circuit, which are not illustrated.

The card-side antenna 11 is wound several times in a rectangular form along outer edges of the substrate 13. The card-side antenna 11 is for supplying power to the IC 12 through electromagnetic induction when the card-side antenna 11 receives a radio wave from an antenna 30 (an example of "a device-side antenna") of a communication device in the liquid crystal display device 20, which will be described later, and establishes wireless communication without contact. A long dimension 2a and a short dimension 2b of an inner perimeter of the innermost trace are 69 mm and 38 mm, respectively. The IC 12 is mounted on a surface of the substrate 13. The card-side antenna 11 is formed on the surface of the substrate 13 by printing. The substrate 13 (or an outline of the IC card 10) has a long dimension c of 85.6 mm and a short dimension d of 54 mm. The card-side antenna 11 and the IC 12 are fixed to the substrate and laminated from both sides.

Figure 2:
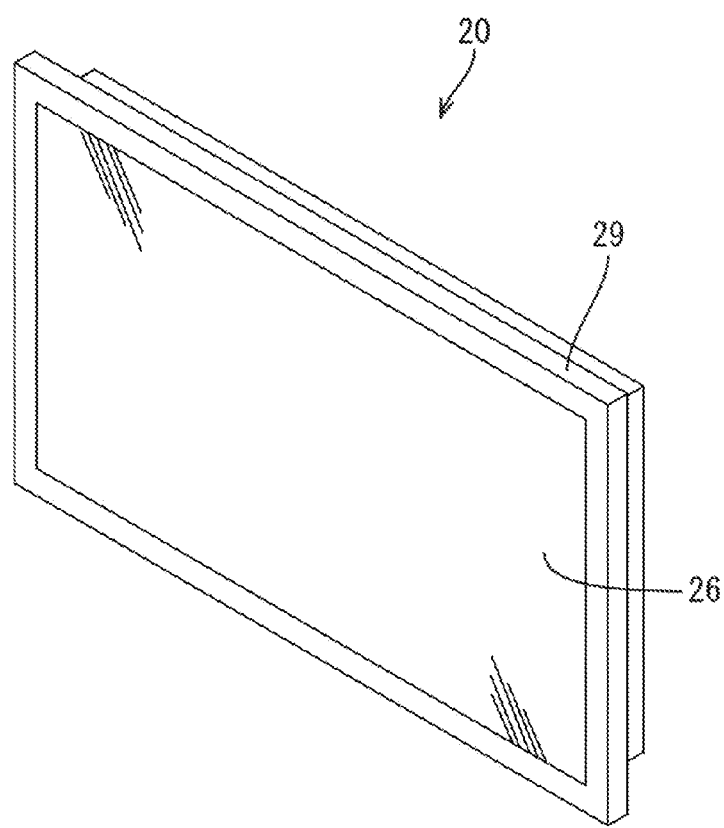
FIG. 2 is a perspective view illustrating a liquid crystal display device.
Figure 4:
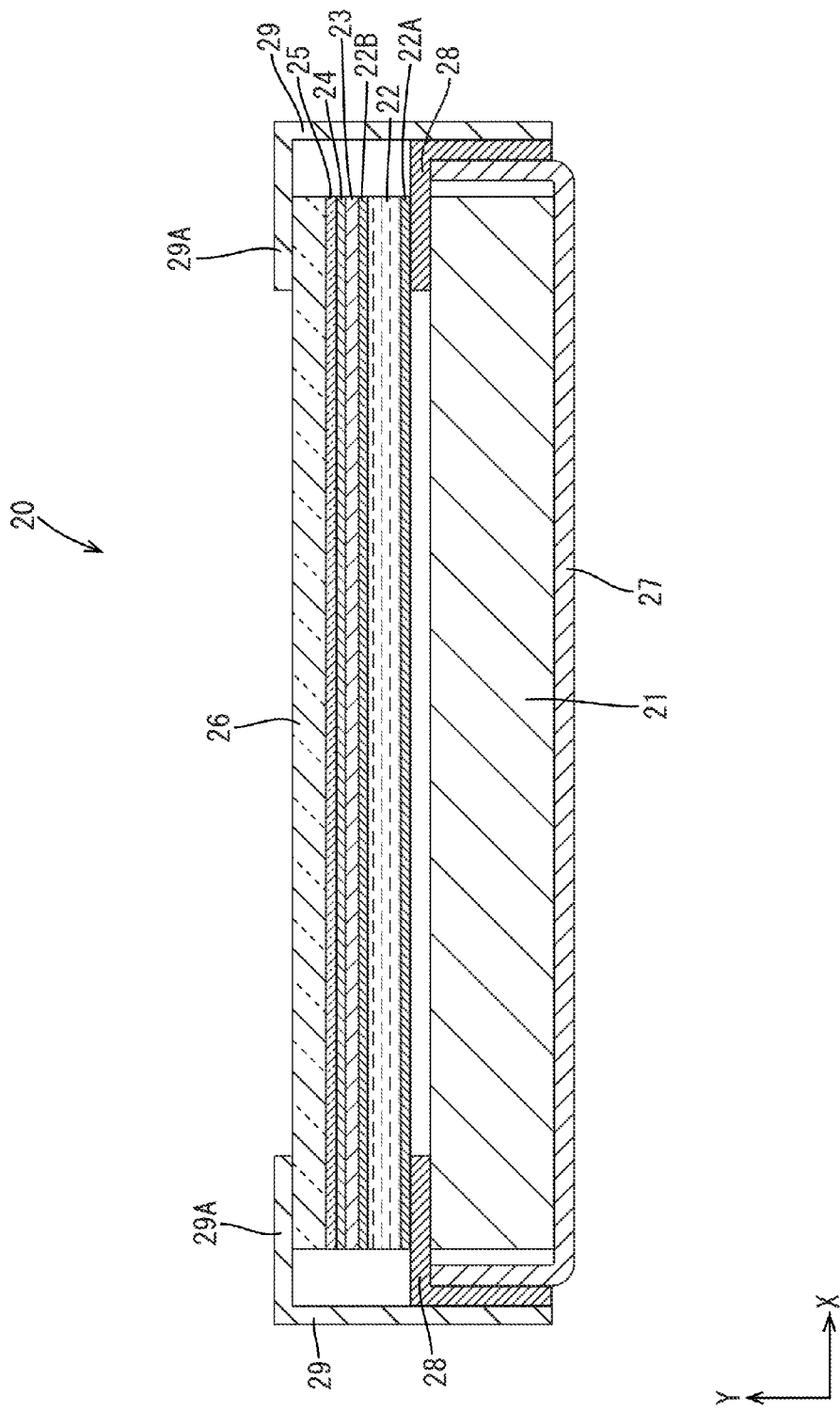
FIG. 4 is a cross-sectional view illustrating the liquid crystal display device.

As illustrated in FIG. 2, the liquid crystal display device 20 has a horizontally-long rectangular overall shape. The liquid crystal display device 20 is placed in a vertical position and used for an electronic device such as an information display, an electronic blackboard, and a television device. As illustrated in FIG. 4, the liquid crystal display device 20 includes a backlight unit 21 (an example of "a lighting device"), a liquid crystal panel 22 (an example of "a display device"), a substrate 23, a mesh layer 24, an adhesive layer 25, and a cover glass 26. The backlight unit 21 is an external light source. The liquid crystal panel 22 is for display images. The substrate 23 is made of a transparent polyethylene terephthalate (PET) which transmits light. The mesh layer 24 transmits light. The adhesive layer 25 is made of transparent material such as an optical clear adhesive (OCA) which transmits light. The backlight unit 21, the liquid crystal panel 22, the substrate 23, the mesh layer 24, the adhesive layer 25, and the cover glass 26 are layered.

Polarizing plates 22A and 22B are attached to surfaces of the liquid crystal panel 22, respectively. The backlight unit 21 is placed in a chassis 27 and held with a frame 28 from the upper side. A front side of a bezel 29 for pressing down the cover glass 26 is a press-down portion 29A for pressing down an edge portion of the cover glass 26.

Figure 3:
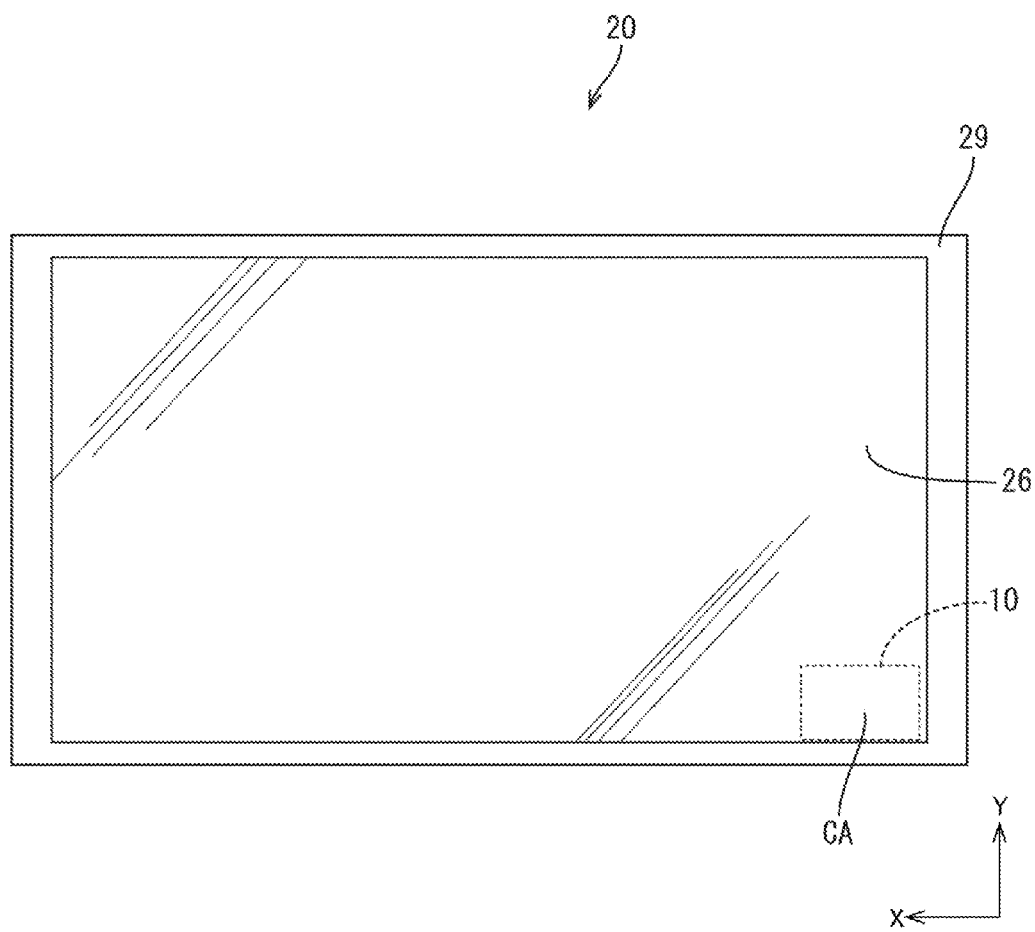
FIG. 3 is a front view illustrating the liquid crystal display device.

An area of the front surface of the liquid crystal display device 20 is a card contact area CA with which the IC card 10 is contacted (see FIG. 3). In this embodiment, a corner of a whole area of the cover glass 26 is configured as the card contact area CA. However, the card contact area CA is not limited to the corner. Any other area may be configured as the card contact area CA.

The mesh layer 24 is made of copper foil and formed in a grid pattern with a number of square voids. Light rays from the outside pass through the square voids, that is, the light rays from the liquid crystal panel 22 pass through the mesh layer 24. In this embodiment, a diagonal dimension of each square (a diagonal dimension of each square void) of the mesh layer 24 is 250 μm and a trace width (a width of each line of four sides of the square) is 10 μm.

Figure 5:
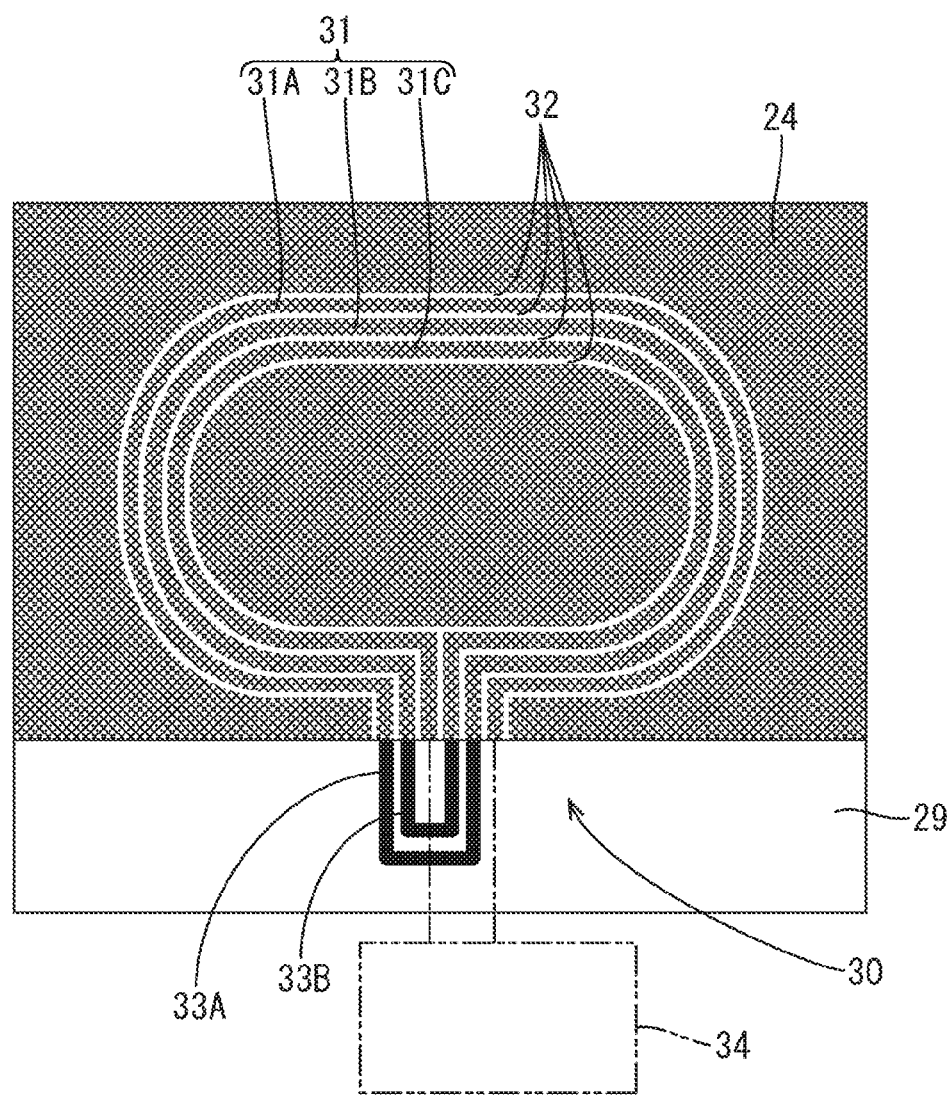
FIG. 5 is a front view including a magnified view of a card contact area in the liquid crystal display device.

As illustrated in FIG. 5, an antenna body 31 having a horizontally-long oval shape is formed in a portion of the mesh layer 24. The antenna 30 includes the antenna body 31 and connecting portions 33A and 33B located inside the bezel 29 and connected to the antenna body 31. The antenna body 31 is a transparent antenna that transmits light. The antenna body 31 includes three circular conductive portions 31A to 31C separated by slits 32 formed in a portion of the mesh layer 24. Each of the conductive portions 31A to 31C of the antenna body 31 in this embodiment has a width of 3 mm (a dimension between the slits 32).

The slits 32 in the mesh layer 24, which demarcate the voids and the antenna body 31, are formed by etching a solid pattern of copper foil attached to an entire surface of the PET substrate 23. The slits 32 of this embodiment are formed simultaneously with formation of the voids in the mesh layer 24. However, the slits 32 may be formed after the etching process for forming the voids in the mesh layer 24. The connecting portions 33A and 33B continue to ends of the conductive portions 31A to 31C. In this embodiment, the connecting portions 33A and 33B are formed in the mesh layer 24 behind the bezel 29. However, the connecting portions that may be copper traces may be connected to portions outside the mesh layer.

Ends of the antenna body 31 are connected to a control portion 34. The control portion 34 includes a circuit board and electronic components mounted on the circuit board, which are not illustrated. The control portion 34 turns on the antenna 30 to transmit information to the card-side antenna 11 and extracts information from the antenna 30. A communication device (a reader/writer) includes the control portion 34 and the antenna 30.

Because the antenna 30 is the transparent antenna that transmits light, the specific resistance is higher than the resistance of the thick metal wire that is normally used for forming a coil. The performance of the antenna is described with a Q factor. The Q factor is calculated from inductance L and resistance R using a formula: $Q = 2\Pi L/R$. Because the Q factor that describes the performance of the antenna is inversely proportional to the resistance, the Q factor needs to be increased by reducing a length of the antenna 30 when using the transparent antenna having such a high resistance. To increase the Q factor by increasing the inductance L, an area surrounded by the transparent antenna 30 needs to be increased. However, by increasing the area surrounded by the transparent antenna 30, the length of the antenna increases. Therefore, the resistance increases and thus the Q factor does not decrease. Namely, L and T are functions that express monotonic increases relative to a size of the coil.

In a condition that a backside of the IC card contacts the card contact area of the cover glass 26, the IC card 10 is 25 mm away from the antenna 30. This satisfies the Felica (trademark) standards, that is, a communication can be established when the IC card 10 is 25 mm high from the antenna 30.

If magnetic flux density, magnetic permeability, and intensity of magnetic field are B [N/Am], μ [N/A2], and H [A/m], respectively, B=μH. If H=I/4Π×HA (current [A] of the card-side antenna 11, pi Π), I/4Π can be considered as a constant value because a current I of the card-side antenna 11 of the IC card 10 is constant when turned on (when the radio wave is transmitted to the antenna 30). If the surface of the IC card 10 is an XY plane and a center of the IC card 10 is an origin, the HA at the point 25 mm from the card-side antenna 11 can be expressed by equation (3) according to Biot-Savart law.

[E1]

$$HA = \frac{|y-19|}{625+(y-19)^2} \tag{3}$$

$$\left\{ \frac{|x-34.5|}{\sqrt{625+(x-34.5)^2+(y-19)^2}} + \frac{|x+34.5|}{\sqrt{625+(x+34.5)^2+(y-19)^2}} \right\}$$

$$+$$

$$\frac{|x-34.5|}{625+(x-34.5)^2}\left\{ \frac{|y-19|}{\sqrt{625+(x-34.5)^2+(y-19)^2}} + \frac{|y+19|}{\sqrt{625+(x-34.5)^2+(y+19)^2}} \right\}$$

$$+$$

$$\frac{|y+19|}{625+(y+19)^2}\left\{ \frac{|x-34.5|}{\sqrt{625+(x-34.5)^2+(y+19)^2}} + \frac{|x+34.5|}{\sqrt{625+(x+34.5)^2+(y+19)^2}} \right\}$$

$$+$$

$$\frac{|x+34.5|}{625+(x+34.5)^2}\left\{ \frac{|y-19|}{\sqrt{625+(x+34.5)^2+(y-19)^2}} + \frac{|y+19|}{\sqrt{625+(x+34.5)^2+(y+19)^2}} \right\}$$

From equation (3), the distribution of HA in a direction perpendicular to the plate surface of the IC card 10 (i.e., a direction perpendicular to the surface on which the antenna 30 is disposed) at the position 25 mm away from the IC card 10 (or the card-side antenna 11) in a direction perpendicular to the plate surface of the IC card 10 is illustrated in FIG. 6.

According to FIG. 6, the magnetic field is high at the center and low at the outer side. Points at which HAs are equal form horizontally-long oval contour.

Figure 8:
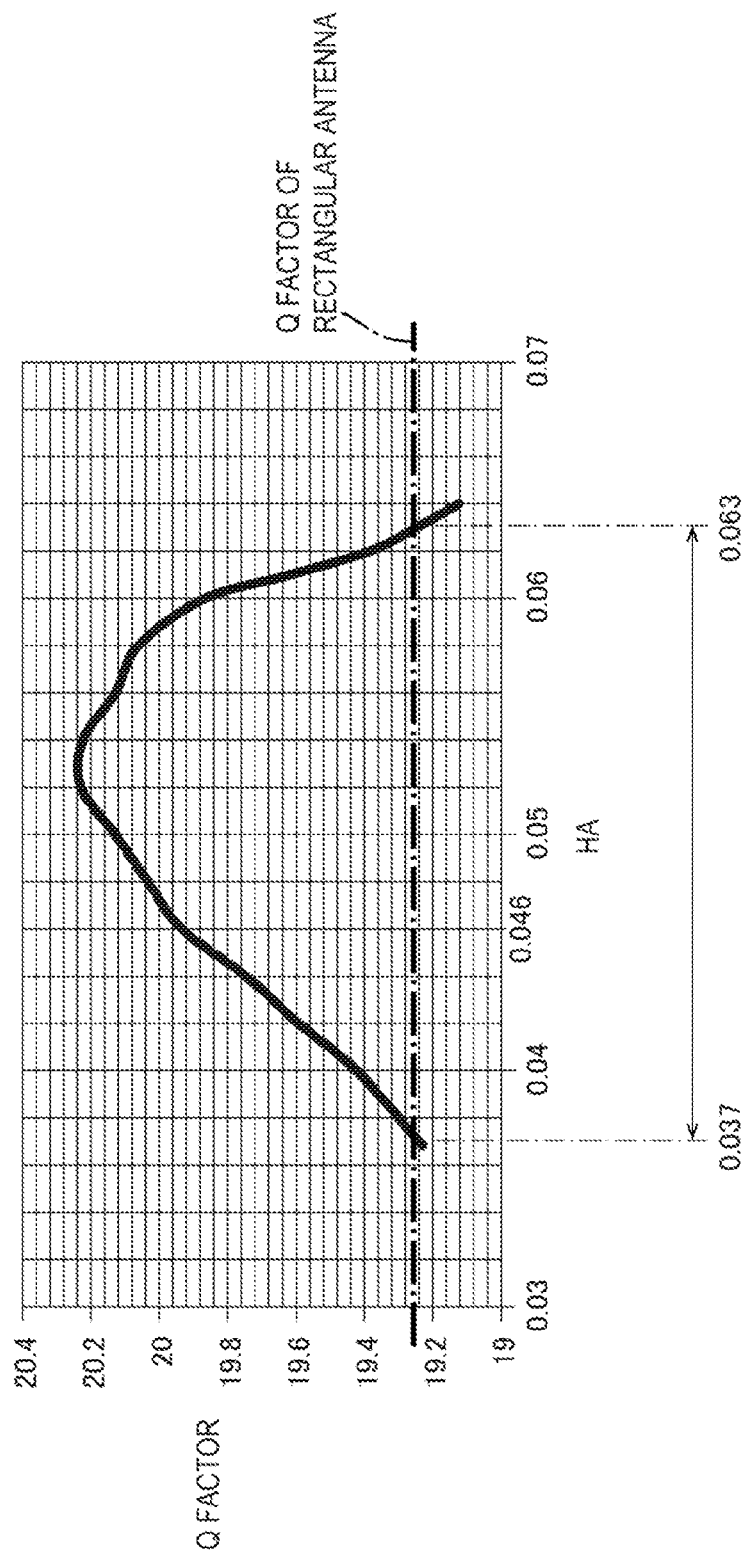
FIG. 8 is a graph illustrating the relationship in FIG. 7.
Figure 9:
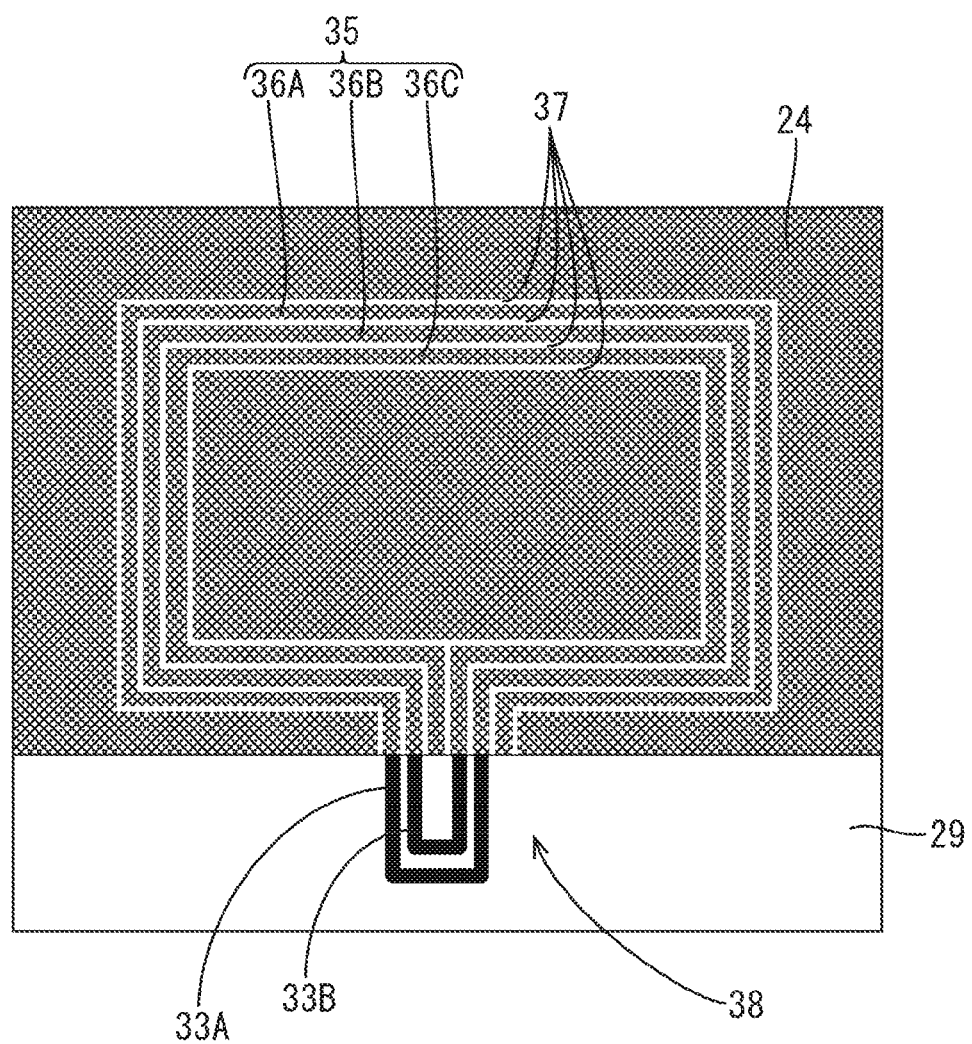
FIG. 9 is a magnified front view of a card contact area of a device-side antenna having a different shape and provided as a comparative example.

FIG. 7 illustrates a relationship between the HAs that are calculated from the above equation and form the oval contour and the Q factors. FIG. 8 is a graph illustrating the relations chip between the HAs and the Q factors in FIG. 7. FIG. 9 illustrates a horizontally-long rectangular antenna 38 provided as a comparative example. The rectangular antenna 38 includes an antenna body 35 including three loops of conductive portions 36A to 36C having a width of 3 mm and separated by slits 37. The Q factor of the rectangular antenna 38 is 19.23. As illustrated in FIG. 8, the Q factor of the antenna 30 in this embodiment is larger than the Q factor of the rectangular antenna 38 when 0.037<HA<0.063. An inner perimeter of the rectangular antenna 38 (an inner perimeter of the conductive portion 36C) is 214 mm. An inner perimeter of the antenna 30 in this embodiment (an inner perimeter of the conductive portion 31C) is 183 mm. Although the inner perimeter of the antenna 30 is shorter than the inner perimeter of the rectangular antenna 38, the Q factor is larger when 0.037<HA<0.063. This describes that the Q factor becomes larger than the Q factor of the rectangular antenna 38 when the intensity of the magnetic field H is 0.037 (I/4Π)<H<0.063 (I/4Π).

As described above, when the antenna 30 (the device-side antenna) establishes the wireless communication with the IC card 10 including the rectangular card-side antenna 11 having the inner perimeter with the long dimension of 69 mm and the short dimension of 38 mm at a distance of 25 mm, the inner perimeter of the antenna 30 is formed at a position at which the intensity of the magnetic field [A/m] produced by the card-side antenna 11 in the direction perpendicular to the surface on which the antenna 30 is disposed is expressed by inequation (1), $$0.037I/4\Pi<H<0.063I/4\Pi \tag{1}$$

where I is a current [A] of the card-side antenna and Π is pi.

According to this embodiment, the area in which intensity of the magnetic field is high is efficiently surrounded by the antenna 30 with the smaller inner perimeter. Namely, the antenna 30 has an efficient antenna shape with the lower resistance and the higher inductance. According to the configuration, the high Q factor that describes the performance of the antenna is achieved and thus the reduction in communication performance can be restricted.

The inner perimeter of the device-side antenna 30 may be formed at a position at which intensity H of the magnetic field [A/m] is expressed by inequation (2)

$$0.046I/4\Pi<H<0.06I/4\Pi \tag{2}$$

Within the range expressed by inequation (2), a gradient of the Q factors relative to the HAs is slightly smaller and the Q factors are stable at high levels. Therefore, the reduction in communication performance is further restricted.

The inner perimeter of the antenna 30 may be formed at positions where the intensity H of the magnetic field [A/m] at one of the positions is equal to the intensity H at another one of the positions. The positions at which the intensities H of the magnetic field are equal are surrounded by the inner perimeter of the antenna 30. An area in which the intensity of the magnetic field is partially low is not included in the area within the inner perimeter of the antenna 30. Therefore, the area having the high intensity of the magnetic field is more efficiently surrounded by the antenna 30 with the length of the antenna 30 maintained low. According to the configuration, the higher Q factor that describes the performance of the antenna can be achieved and thus the decrease in communication performance is further restricted.

The liquid crystal display device 20 (the display device) includes the communication device, the backlight unit 21 (the lighting device), and the liquid crystal panel 22 (the display portion). The backlight unit 21 is for emitting light. The liquid crystal panel 22 is for displaying an image with light emitted by the backlight unit 21 and transmitted through the antenna 30. According to the configuration, the image is properly displayed at a position where the antenna 30 is disposed.

The bezel 29 holds the edge portion of the liquid crystal display device 20 from the front side. The portion of the antenna 30 is formed in the area covered with the bezel 29 from the front side.

Because the light needs to be transmitted in the area in which an image is displayed, the antenna 30 cannot be formed with flexibility. In this embodiment, the antenna 30 is formed in the area that is covered with the bezel 29 from the front side. Therefore, the antenna 30 can be formed with a certain level of flexibility.

Second Embodiment

A second embodiment will be described with reference to FIG. 10.

Figure 10:
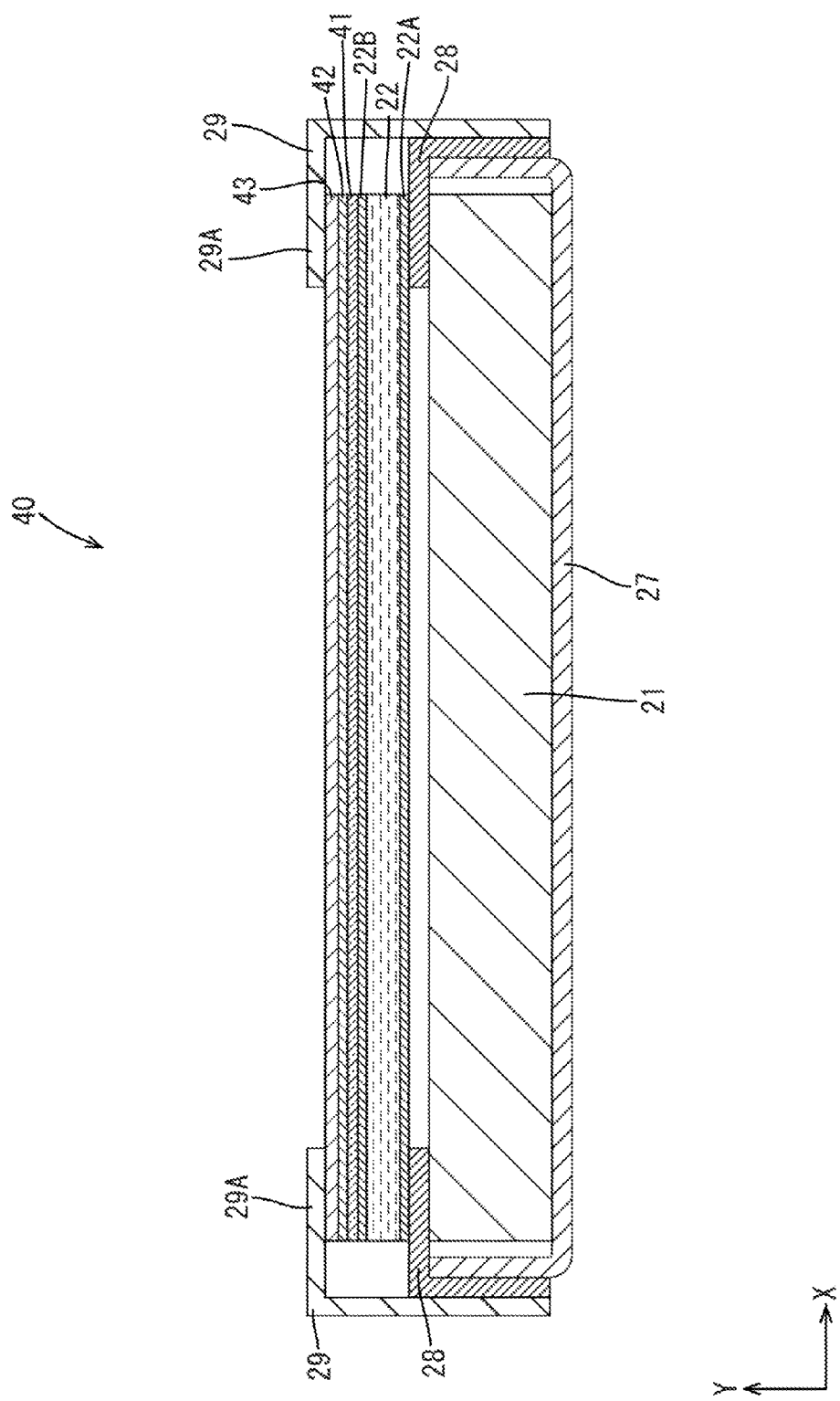
FIG. 10 is a cross-sectional view illustrating a liquid crystal display device according to a second embodiment.

As illustrated in FIG. 10, a liquid crystal display device 40 according to the second embodiment includes an adhesive layer 41, a mesh layer 42, and a PET substrate 43 layered in this order on a polarizing plate 22B of a liquid crystal panel 22. The adhesive layer 41 is an optically clear adhesive (OCA) which transmits light. An antenna body 31 is formed on the mesh layer 42. Other configurations are similar to the configurations of the first embodiment. The configurations the same as the configurations of the first embodiment are indicated with the same symbols and will not be described.

According to the configuration, the cover glass 26 is not required and thus the configuration of the liquid crystal display device can be simplified.

Third Embodiment

A third embodiment will be described with reference to FIGS. 11 and 12.

Figure 11:
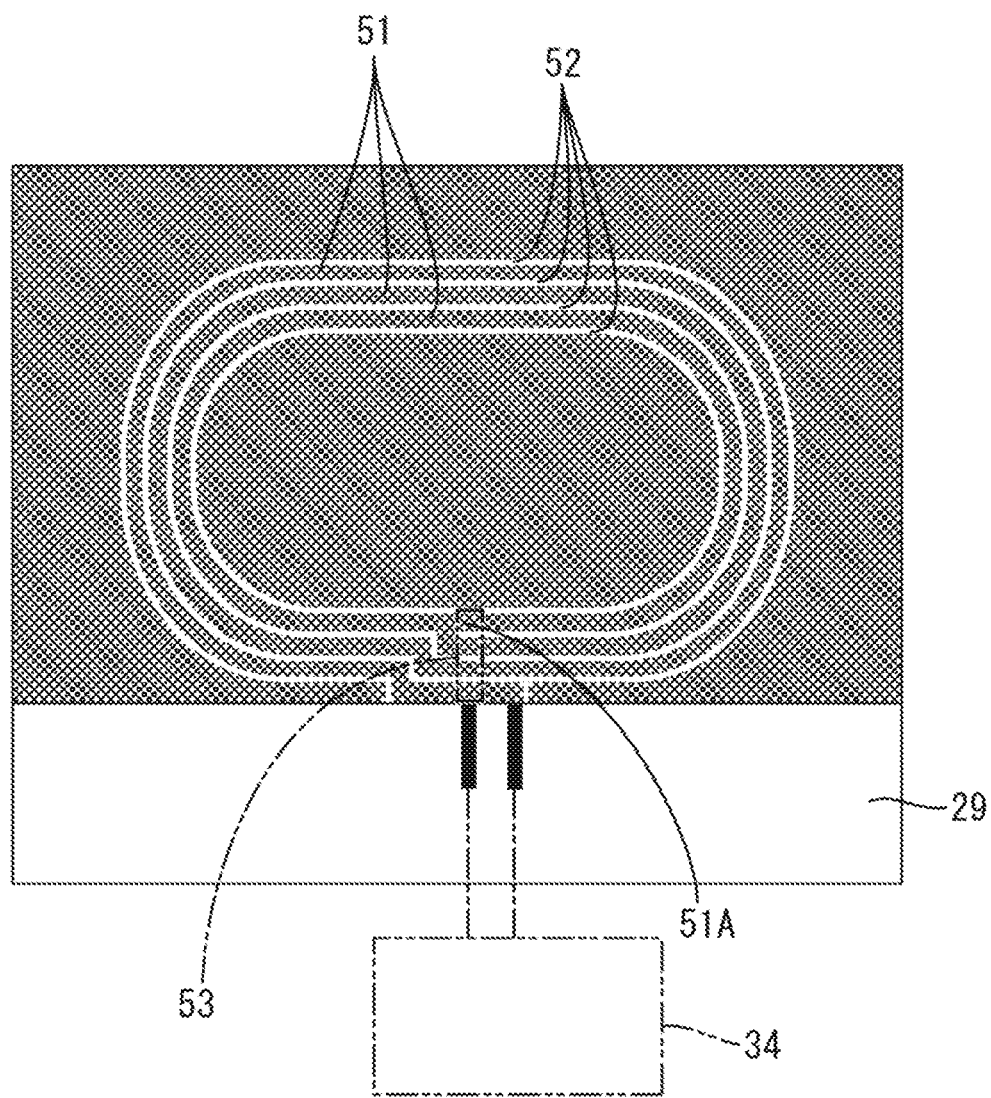
FIG. 11 is a magnified front view of a card contact area according to a third embodiment.

As illustrated in FIG. 11, a liquid crystal display device 50 according to the third embodiment an antenna 51 that is formed by forming a spiral slit 52. The antenna 51 is formed from a single conductive portion including three loops (multiple loops) and one end 51A on an inner perimeter side of the antenna 51 is extended to an area outside the antenna 51 using a bridging layer 53. The connecting portions 33A and 33B of the first embodiment are not provided. Other configurations are the same as the above embodiments. The same configurations are indicated with symbols the same as the above embodiments and will not be described.

Figure 12:
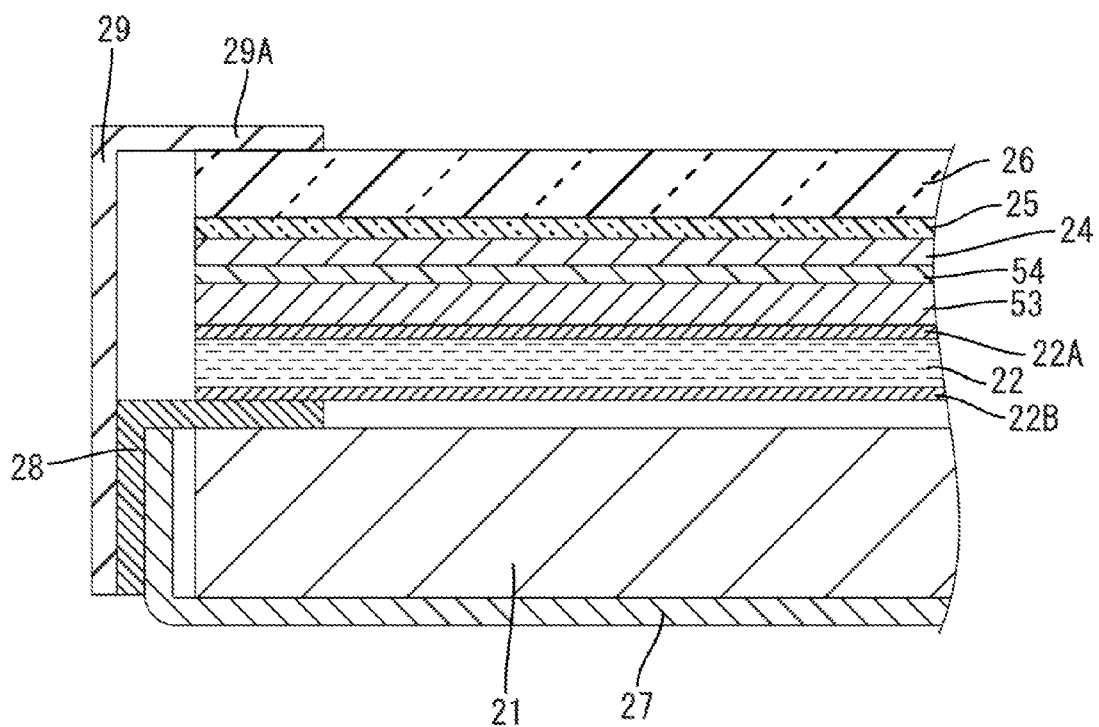
FIG. 12 is a cross-sectional view of a portion in which a bridging layer in FIG. 11 is formed.

As illustrated in FIG. 12, at the end on the inner perimeter side of the antenna 51, the bridging layer 53, an insulating layer 54, a mesh layer 24, an adhesive layer 25, and a cover glass 26 are layered in this sequence on a polarizing plate 22B of a liquid crystal panel 22. The insulating layer 54 may be made of polyethylene terephthalate (PET). The bridging layer 53 is made of indium tin oxide (ITO). The bridging layer may be formed from the mesh layer.

Other Embodiments

The present invention is not limited to the embodiments described above and illustrated by the drawings. For example, the following embodiments will be included in the technical scope of the present invention.

(1) The mesh layer 24 or 42 of the antenna 30 is not limited to the configuration of the above embodiments. The width or the diagonal dimension (or the distance between the traces) may be altered. A transparent electrode made of indium tin oxide (ITO) which transmits light may be configured as an antenna (or an antenna body). The antenna may have a multi-layer structure including a mesh layer and a transparent electrode made of indium tin oxide (ITO) which transmits light. The antenna body 31 of the antenna 30 is the transparent antenna. However, the entire antenna 30 may be a transparent antenna. The device-side antenna may be an opaque antenna rather than the transparent antenna (e.g., an opaque antenna made from a solid metal film without a mesh pattern). A two-dimensional shape of the antenna (or the antenna body) is not limited to the horizontally-long oval shape in the above embodiments. For example, the shape may be a vertically-long oval.

(2) The loops (or the number of the conductive portions) of the card-side antenna or the device-side antenna are not limited to the loops of the above embodiments. One loop or multiple loops other than the loops of the above embodiments may be used.

(3) The antenna 30 passes the points at which the intensities H of the magnetic field are equal for the entire length. However, the inner perimeter of the antenna may pass points at which the intensities H of the magnetic field are different.

(4) The communication device is included in the liquid crystal display device 20, 40, or 50. However, the communication device may be included in an electronic device that does not include a display function such as a liquid crystal panel. The position is not limited to the vertical position. The position may be a horizontal position. The display device is not limited to the liquid crystal display device including the liquid crystal panel as a display panel. For example, a display device including a plasma display panel (PDP), an organic EL panel, or an electrophoretic display (EPD) panel may be used. Such a display device does not require a backlight unit. A display device including a MEMS display panel may be used. The present invention may be applied to a liquid crystal display device used for a PC monitor (including a desktop PC monitor and a notebook PC monitor) other than the electronic device including the information display, the electronic blackboard, and the television device. The present invention may be applied to a liquid crystal display device used for an electronic device including a tablet terminal, a phablet terminal, a smartphone, a mobile phone, and a portable video game player.

(5) For the wireless communication between the IC card (or the card-side antenna) and the antenna with the distance of 25 mm, if inequation (1) or (2) is satisfied, an actual distance (a distance between the IC card 10 in contact with the card contact area CA and the antenna 30 or 51) may be smaller than 25 mm. For example, the actual communication distance may be some millimeters smaller than 25 mm.

EXPLANATION OF SYMBOLS

10: IC card, 11: card-side antenna, 20, 40, 50: liquid crystal display device, 24, 42: mesh layer, 29: bezel, 29A: press-down portion, 30, 51: antenna (device-side antenna), 31: antenna body, 33A, 33B: connecting portion, CA: card contact area

The invention claimed is:

1. A communication device comprising a device-side antenna for wireless communication with an IC card including a card-side antenna wound in a rectangular form, wherein
the device-side antenna formed in one or multiple loops, and
during the wireless communication with the IC card having an inner perimeter with a long dimension of 69 mm and a short dimension of 38 mm at a distance of 25 mm, an inner perimeter of the device-side antenna is formed at a position at which intensity H of a magnetic field produced by the card-side antenna in a direction perpendicular to a surface on which the device-side antenna is disposed is in a range expressed by inequation (1):

$$0.037I/4\Pi < H < 0.063I/4\Pi \quad (1)$$

where I is a current of the card-side antenna and $\Pi$ is pi.

2. The communication device according to claim 1, wherein the inner perimeter of the device-side antenna is formed at a position at which the intensity H of the magnetic field is in a range expressed by inequation (2):

$$0.046I/4\Pi < H < 0.06I/4\Pi \quad (2).$$

3. The communication device according to claim 1, wherein the inner perimeter of the device-side antenna is formed at positions where the intensity H of the magnetic field at one of the positions is equal to the intensity H at another one of the positions.

4. A display device comprising:
the communication device according to claim 1;
a lighting device for emitting light; and
a display device including a display portion for displaying an image with the light emitted by the lighting device and transmitted through the device-side antenna.

5. The display device according to claim 4, further comprising a bezel holding an edge portion of the display device from a front side, wherein a portion of the device-side antenna is formed in an area covered with the bezel from the front side.

6. A communication system comprising:
the IC card; and
the communication device according to claim 1.

* * * * *